(12) United States Patent
Lau

(10) Patent No.: US 10,166,906 B1
(45) Date of Patent: Jan. 1, 2019

(54) CONVERSION DEVICE TO TRANSFORM A FLAT BED INTO A TRUCK BED AND THE METHOD TO USE

(71) Applicant: David Lau, St. Augustine, FL (US)

(72) Inventor: David Lau, St. Augustine, FL (US)

( * ) Notice: Subject to any disclaimer, the term of this patent is extended or adjusted under 35 U.S.C. 154(b) by 0 days.

(21) Appl. No.: 15/597,899

(22) Filed: May 17, 2017

(51) Int. Cl.
*B62D 33/04* (2006.01)
*B60P 3/42* (2006.01)
*B62D 33/027* (2006.01)
*B62D 33/02* (2006.01)

(52) U.S. Cl.
CPC ............ *B60P 3/42* (2013.01); *B62D 33/0207* (2013.01); *B62D 33/0276* (2013.01)

(58) Field of Classification Search
CPC .. B62D 33/0207; B62D 33/03; B62D 33/033; B62D 33/0276; B60P 3/42
USPC ................................ 296/26.04, 26.06, 26.07
See application file for complete search history.

(56) References Cited

U.S. PATENT DOCUMENTS

| | | | | |
|---|---|---|---|---|
| 2,172,027 A * | 9/1939 | Mashak | .................... | B61D 3/08 16/270 |
| 2,856,225 A * | 10/1958 | Selzer | .................. | B62D 33/023 296/13 |
| 3,614,152 A * | 10/1971 | Hancock | .................... | B60P 3/34 296/103 |
| 3,741,605 A * | 6/1973 | Lee | .......................... | B60P 3/42 296/10 |
| 4,216,988 A * | 8/1980 | Weiss | ..................... | B62D 33/03 296/10 |
| 6,332,637 B1 | 12/2001 | Chambers | | |
| 6,634,689 B1 | 10/2003 | Soto | | |
| 6,644,708 B1 * | 11/2003 | Grzegorzewski | ......... | B60P 1/43 296/10 |
| 6,758,514 B1 * | 7/2004 | Walkden | ................ | B62D 33/02 296/165 |
| 7,118,165 B2 * | 10/2006 | Nelson | ............... | B62D 33/0276 296/186.2 |
| 8,251,423 B1 * | 8/2012 | Lingle | ........................ | B60R 3/00 296/1.02 |
| 8,740,277 B1 * | 6/2014 | Al-Qahtani | ........ | B62D 33/0207 296/3 |
| 8,857,880 B2 * | 10/2014 | Kalergis | .................... | B60P 1/43 224/403 |
| 9,085,332 B2 * | 7/2015 | McBride | ............... | B62D 33/023 |
| 9,227,675 B1 * | 1/2016 | Elquest | ................ | B62D 33/033 |
| 9,688,466 B2 * | 6/2017 | Ronstadt | ............ | B65D 90/0086 |
| 9,758,198 B2 * | 9/2017 | Brown | ............... | B62D 33/0207 |
| 2004/0017094 A1 * | 1/2004 | Bruton | ................... | B60N 2/783 296/153 |
| 2009/0214325 A1 * | 8/2009 | White | ..................... | B60P 1/435 414/537 |
| 2015/0008693 A1 | 1/2015 | Andreou | | |
| 2017/0120961 A1 * | 5/2017 | Diller | ................ | B62D 33/0207 |

* cited by examiner

*Primary Examiner* — Pinel E Romain
(74) *Attorney, Agent, or Firm* — Lawrence J. Gibney, Jr.; Mitchell Ghaneie

(57) ABSTRACT

This invention is a retractable cargo wall for flatbed trucks and trailers that lowers into an enclosure that may be rollup canister or tray. Once the cargo walls are lowered, the posts supporting the walls may collapse into the bed, thereby transforming a bed with cargo walls into a flatbed. It is also anticipate that a truck or trailer bed with posts can be transformed into a flatbed truck or trailer.

3 Claims, 16 Drawing Sheets

CONVERSION DEVICE TO TRANSFORM A FLAT BED INTO A TRUCK BED AND THE METHOD TO USE

BACKGROUND OF THE INVENTION

A. Field of the Invention

The present invention relates to providing adjustable cargo walls for the flatbed of a truck or trailer to ensure safety when hauling tools and equipment on the road.

B. Prior Art

Contractors and employees in the construction industry often haul tools and equipment to jobsites in a flatbed truck. Flatbed trucks are beneficial to workers because a ledge or wall is not in the way of removing or loading items from the side of the truck. However, flatbed trucks can be quite dangerous when equipment, tools, and other items are in transit. Flatbed trucks are known for not being safe and there are relatively few areas that an item can be tied down. Accordingly, workers are advised not to take loaded flatbed trucks on the highway or other high speed limit roads.

While there are many types of truck beds and modifications to truck beds, none provide the unique and novel features of the present invention. For example, US Patent Application Publication 2015/0008693, U.S. Pat. No. 6,332,637, and U.S. Pat. No. 6,634,689 disclose truck beds that provide side rails that extend upward. In addition to the referenced prior art there are flatbed fold-down side panels.

None of the prior art discloses flatbed cargo walls that rollup or are stowed away underneath the truck bed. Furthermore, the prior art does not disclose posts that can be stowed away flush into the flatbed itself. These features provide a safe and convenient option for workers in the field. The present invention additionally allows for advertising to be placed on the siding, which is currently unavailable for flatbed trucks.

BRIEF SUMMARY OF THE INVENTION

This invention is a retractable cargo wall for a flatbed truck or trailer, which is described in six separate embodiments. The first embodiment is a retractable wall that retracts down and rolls into a canister. The second embodiment is a retractable wall that retracts down into a tray underneath the flatbed or trailer. Both embodiments provide posts with tracks that are stowed flush with the flatbed or trailer when not in use. The third embodiment shows only the pivoting posts and stationary posts being utilized without a plurality of retractable walls. The fourth embodiment utilizes the roll up walls and roll-up canister similar to the first embodiment except a trailer is used. The fifth embodiment utilizes a retractable wall and tray similar to the second embodiment except on a trailer. The sixth embodiment utilizes a plurality of posts on a trailer without the rollup walls, rollup canisters, or trays.

The cargo walls and posts operate to assist with safely transporting items of various sizes while also providing the benefits of loading and unloading items from a flatbed truck or trailer. For example, a user can place an item in the flatbed truck or trailer and then pull the wall into a raised position. The wall would then prevent the item from falling out of the truck or trailer during transportation. Furthermore, if the item is long, similar to a stack of two by fours or rebar, multiple walls can be retracted into a lowered position and the pivoting posts can be lowered into the bed of the truck or trailer. In turn, the items can be loaded, transported, as well as unloaded safely and easily.

NUMBER REFERENCES

Figure 1:
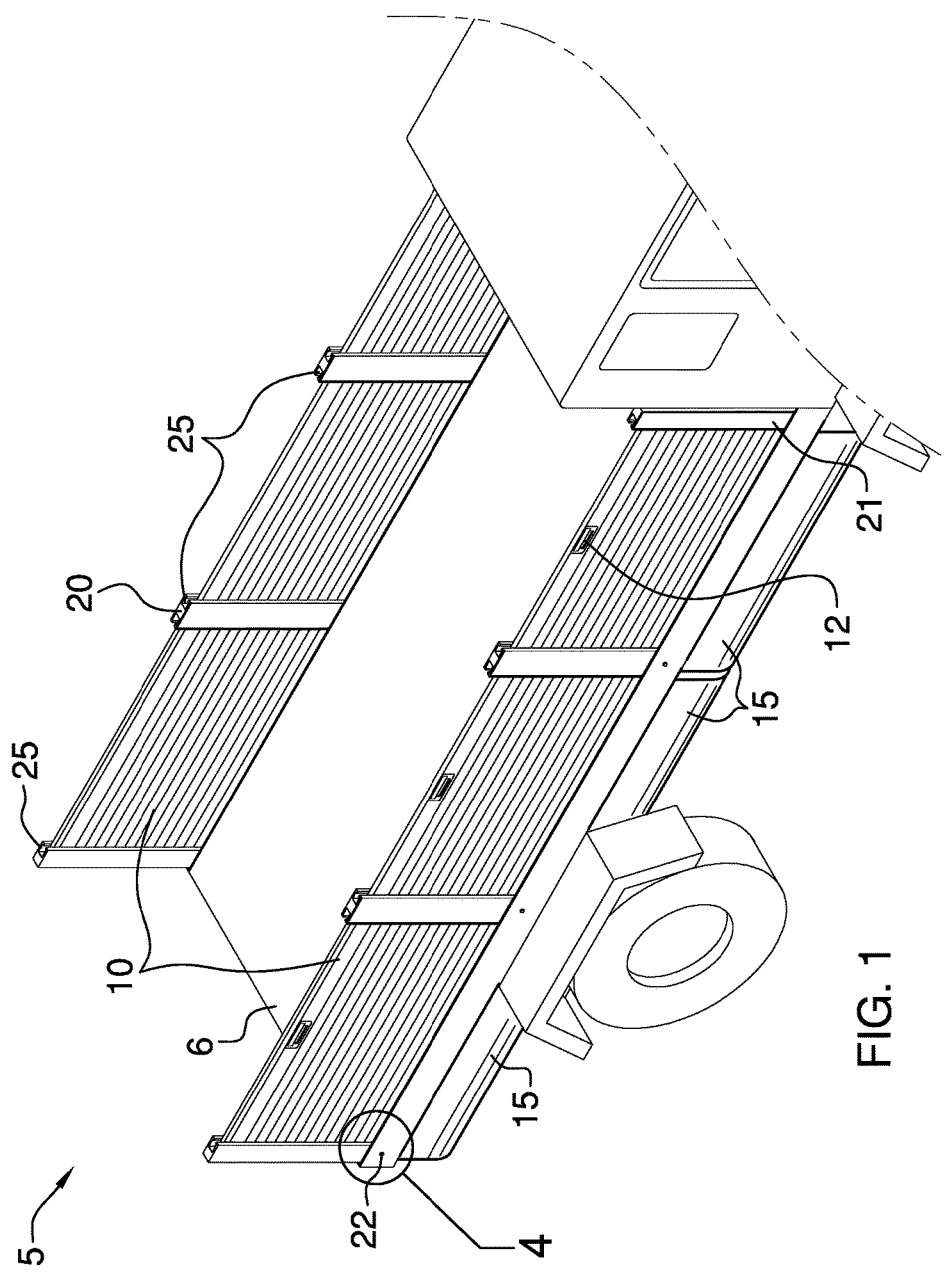
FIG. 1 is an isometric view of the first embodiment, which shows the cargo walls in a raised position.

5—Device
6—Flatbed of truck
7—Flatbed of trailer
10—Cargo walls
11—Wheels
12—Handle of Cargo Wall
13—Rod of Cargo Wall
15—Roll-up canister
20—Pivot post
21—Fixed Post
22—Locking pin
25—Post Track
26—Post hole 30—Post cavity
60—Tray
70—Tray Track

DETAILED DESCRIPTION OF THE EMBODIMENTS

This invention 5 is a set of retractable cargo walls 10, which are intended to provide a user with improved versatility in loading, transporting, and offloading items on a truck or trailer. This invention is described in six separate embodiments: The first embodiment discloses a cargo wall 10 that can retract into a rollup canister 15, which is attached the bottom of a flatbed truck 6; the second embodiment discloses a cargo wall 10 retracting into a tray underneath the flatbed of a truck 6; the third embodiment discloses a flatbed 6 with posts 20 that fold down flush into the flatbed 6 of the truck; the fourth embodiment discloses a cargo wall 10 retracting in a canister 15 attached to the side of the flatbed of a trailer 7; the fifth embodiment discloses a cargo wall 10 retracting into a tray 60 attached underneath the flatbed 7 of the trailer; the sixth embodiment discloses a flatbed trailer 7 with posts 20 that fold down flush into the flatbed 7 of the trailer.

Each embodiment is intended to allow a user to safely transport items on a flatbed. Flatbed trucks and flatbed trailers are useful because they are extremely easy to load and unload tools and other equipment. However, because the bed is flat and no sides are provided, it can be extremely dangerous to transport tools and equipment. Each embodiment can substantially improve safety and maintain the benefits of using a flatbed truck or trailer.

While Embodiment 1, Embodiment 2, Embodiment 4, and Embodiment 5 show and discuss the invention as having a total of six retractable cargo walls 10 and six pivoting posts 20, the number of walls and posts can vary depending on the size of the truck bed 6 or trailer bed 7. With regard to Embodiment 3 and Embodiment 6 the number of pivoting posts 20 and fixed posts 21 can vary depending on the user's preference and size of the truck or trailer bed.

First Embodiment

The first embodiment of this invention is comprised of cargo walls 10, a handle 12 for each cargo wall 10, a plurality of wheels 11, roll-up canisters 15, pivot posts 20, fixed posts 21, locking pins 22, and post tracks 25. The roll-up canisters 15 are attached to the side of the bed 6 of the flatbed truck, which is shown in FIG. 1. The cargo walls 10 can be raised and lowered as the user desires by sliding the cargo walls 10 along the tracks 25 in the pivot posts 20 as well as the tracks 25 in the fixed posts 21. A plurality of wheels 11 are provided on the walls 10 and enable the walls 10 to slide within the tracks 25.

Figure 2:
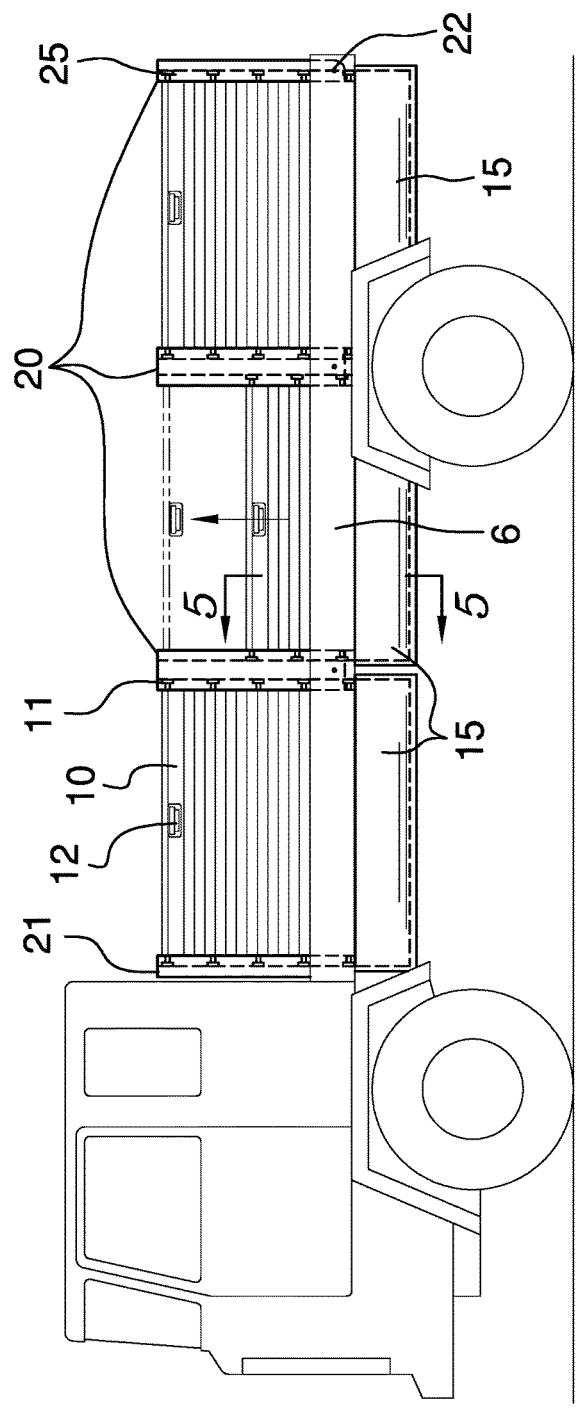
FIG. 2 is a side view of the first embodiment, showing a cargo wall in a partially raised position.

A handle 12 is provided for the user to grasp when raising and lowering the door. It is anticipated for the walls 10 to be raised and lowered at variable heights as the user desires, which is shown in FIG. 2. The handle 12 located on the exterior of the wall 10 is similar to the handle commonly used on the tailgate of a truck. The handle 12 is pulled or released it actuates a rod 13 within the cargo wall 10, which extend into one of a plurality of holes 26 placed within the track 25 of a pivoting post 20 or fixed post 21. When the handle 12 is released, rod 13 extends into one of the plurality of holes 26, thereby locking the cargo wall 10 into position along the track 25 of the respective adjacent posts. It is anticipated that the cargo walls 10 will be spring loaded to counter the weight of the wall as it is raised and lowered. The spring can be housed in the rollup canister 15. Alternatively, an electric motor can be utilized to raise and lower the cargo walls 10 as well. Furthermore, the leading edge of the cargo wall 10 acts as a top rail.

Figure 3:
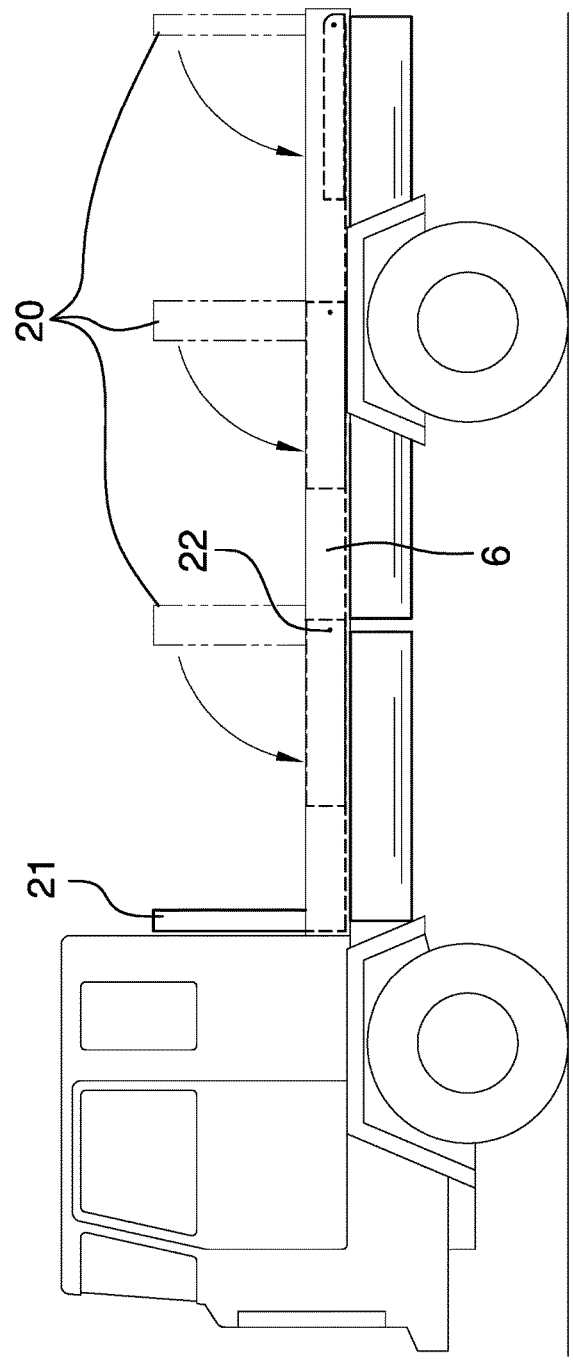
FIG. 3 is side view of the first embodiment, showing the cargo walls in a stowed position and the pivoting posts collapsed flush with the flatbed truck.
Figure 4:
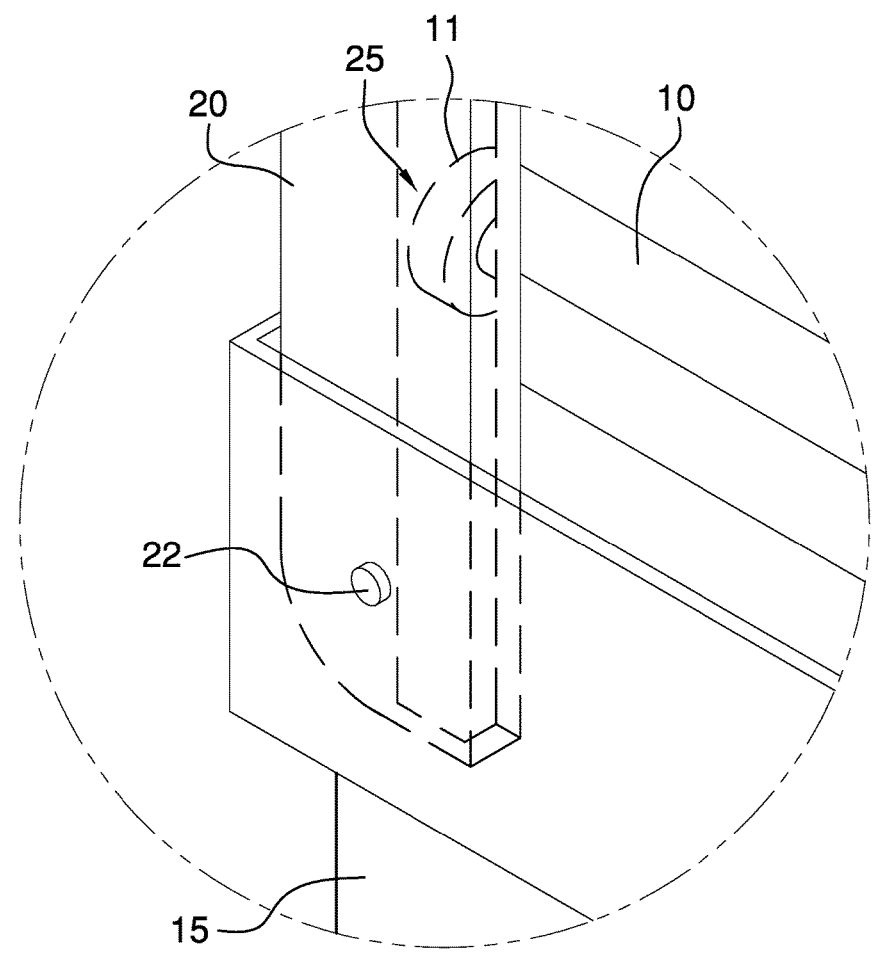
FIG. 4 is a close-up view from FIG. 1 showing a back-corner pivoting post with a pin locking the post in an upright position.
Figure 5:
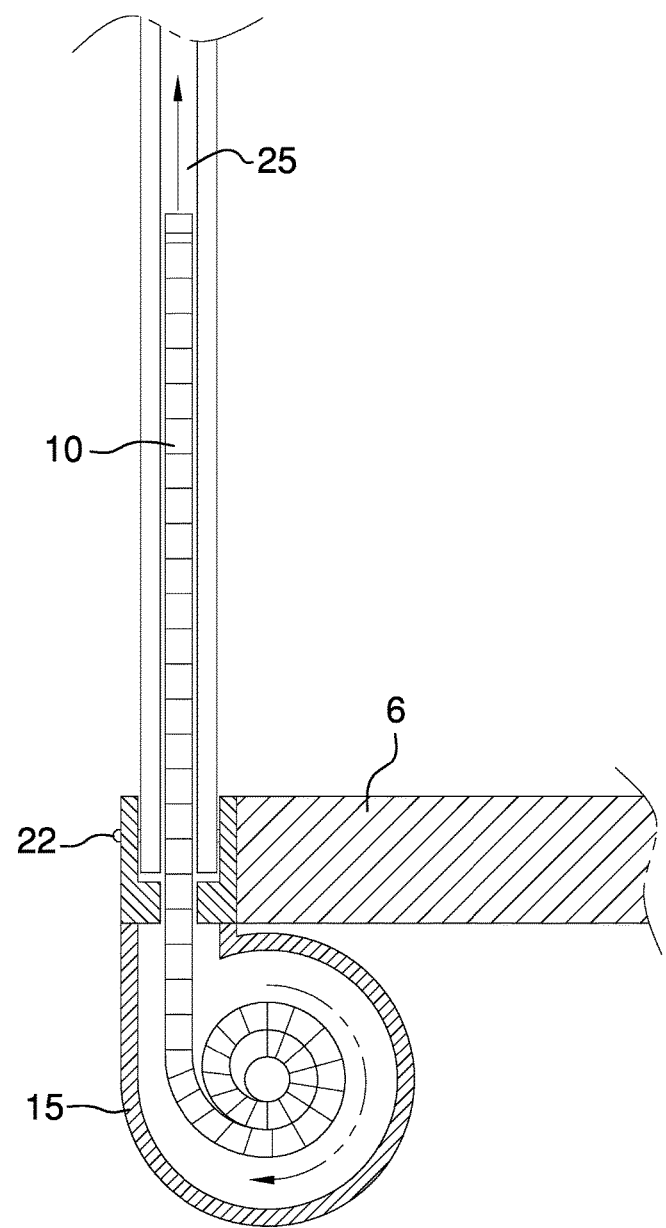
FIG. 5 is cross-sectional view from FIG. 2, which shows the cargowall partially raised and partially stowed away in a rollup canister.
Figure 6:
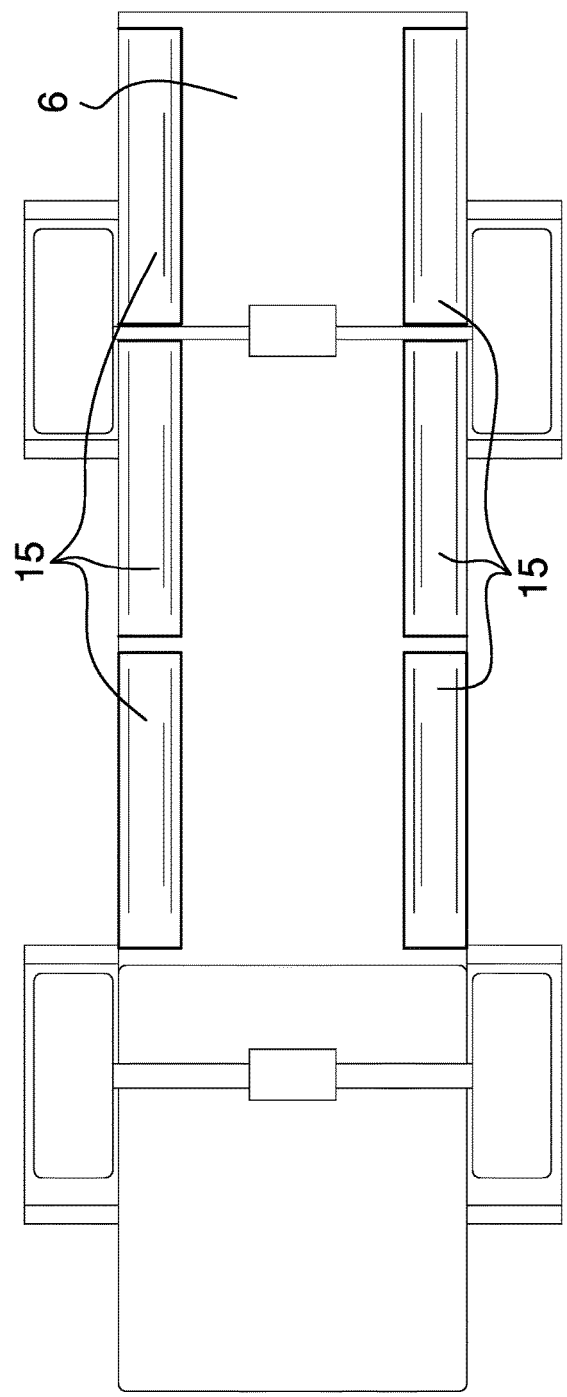
FIG. 6 is a bottom view of the first embodiment showing the rollup canisters and the bottom of the flatbed.

The pivoting posts 20 are also capable of being raised and lowered. When the pivoting posts are in a lowered position, they are laid in a horizontal position in a cavity 30 of the bed 6 of the truck. The cavity 30 is located on the sides of the bed 6, which is shown in FIG. 3. The pivot posts 20 are locked in a lowered position or a raised position with a locking pin 22. Some pivot posts 20 may have a track 25 on opposing sides and other pivot posts would have only one track 25, which is shown in FIG. 1.

Second Embodiment

Figure 8:
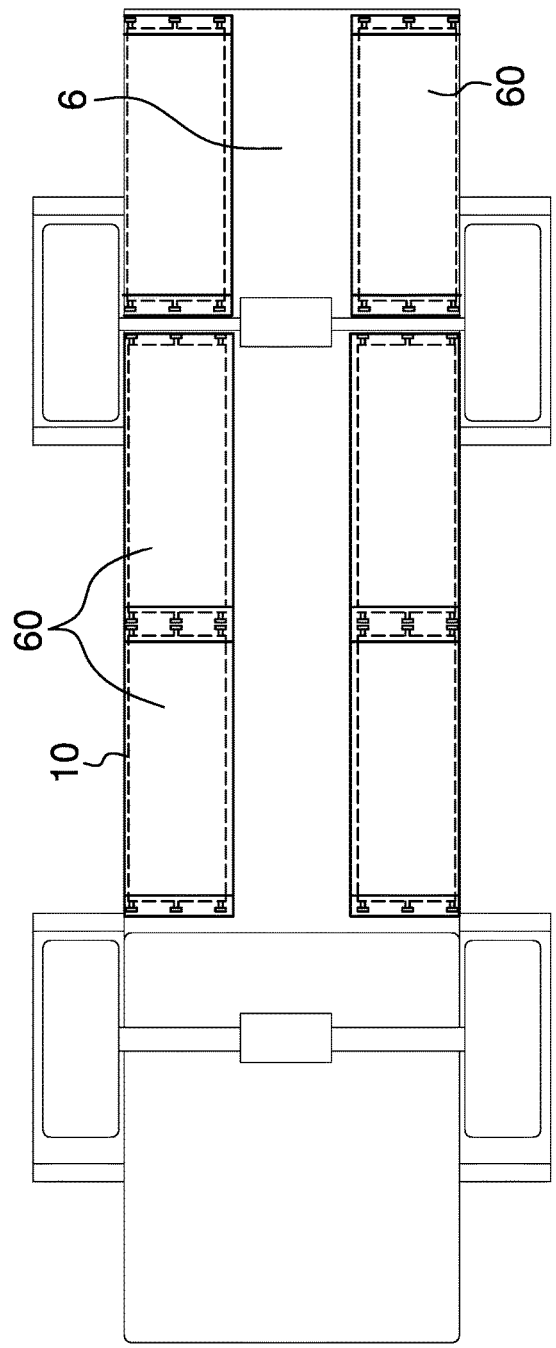
FIG. 8 is a bottom view of the second embodiment showing the trays on the bottom of the flat bed.
Figure 9:
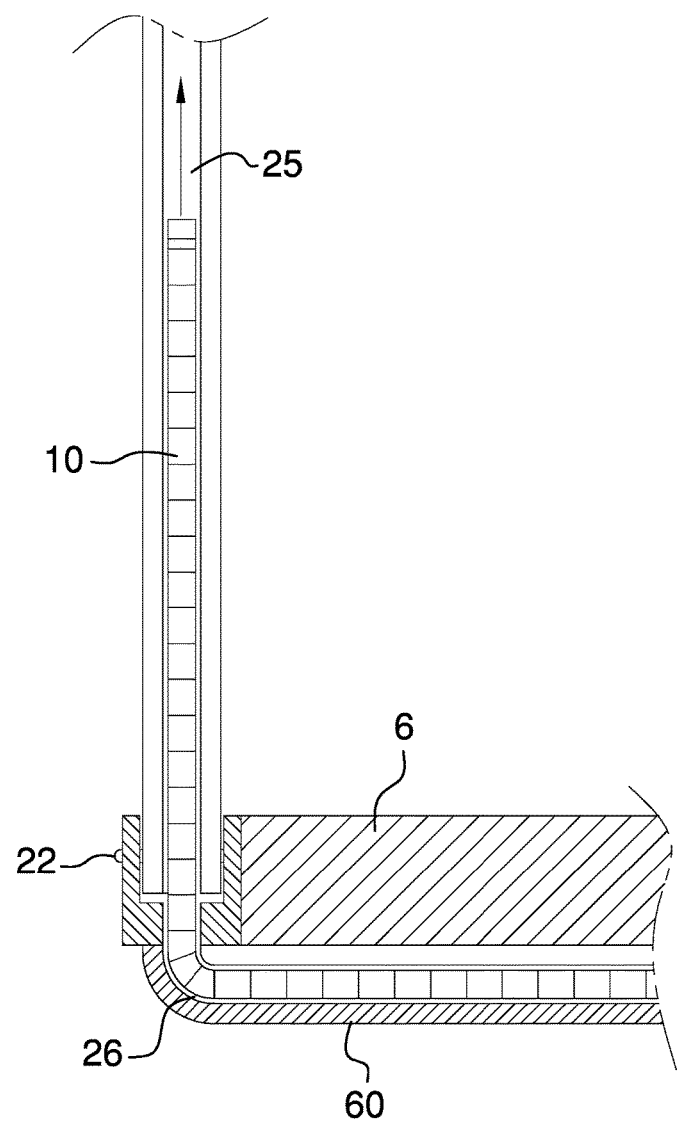
FIG. 9 is a cross-sectional view from FIG. 7 showing the cargo walls partially raised and partially stowed in the tray.

The second embodiment of this invention is comprised of a bed cargo walls 10, a plurality of wheels 11, a handle 12 for each cargo wall 10, trays 60, pivot posts 20, fixed posts 21, locking pins 22, and post tracks 25, and tray tracks 70. The trays 60 are attached to the bottom of the bed 6 of the flatbed truck, which is shown in FIG. 8. The walls 10 can be raised and lowered as the user desires by sliding the walls 10 along the tracks 25 and tracks 70. A plurality of wheels 11 are provided on the walls 10 and enable the walls 10 to slide within the tracks 25 and tracks 70.

A handle 12 is provided for the user to grasp when raising and lowering the wall 10. It is anticipated for the walls 10 to be raised and lowered at variable heights as the user desires. The handle 12 located on the exterior of the wall 10 is similar to the handle commonly used on the tailgate of a truck. The handle 12 is pulled or released it actuates a rod 13 within the cargo wall 10, which extend into one of a plurality of holes 26 placed within the track 25 of a pivoting post 20 or fixed post 21. When the handle 12 is released, rod 13 extends into one of the plurality of holes 26, thereby locking the cargo wall 10 into position along the track 25 of the respective adjacent posts. It is anticipated that the cargo walls 10 will be spring loaded to counter the weight of the wall as it is raised and lowered. Alternatively, an electric motor can be utilized to raise and lower the cargo walls 10 as well. Furthermore, the leading edge of the cargo wall 10 acts as a top rail.

Figure 7:
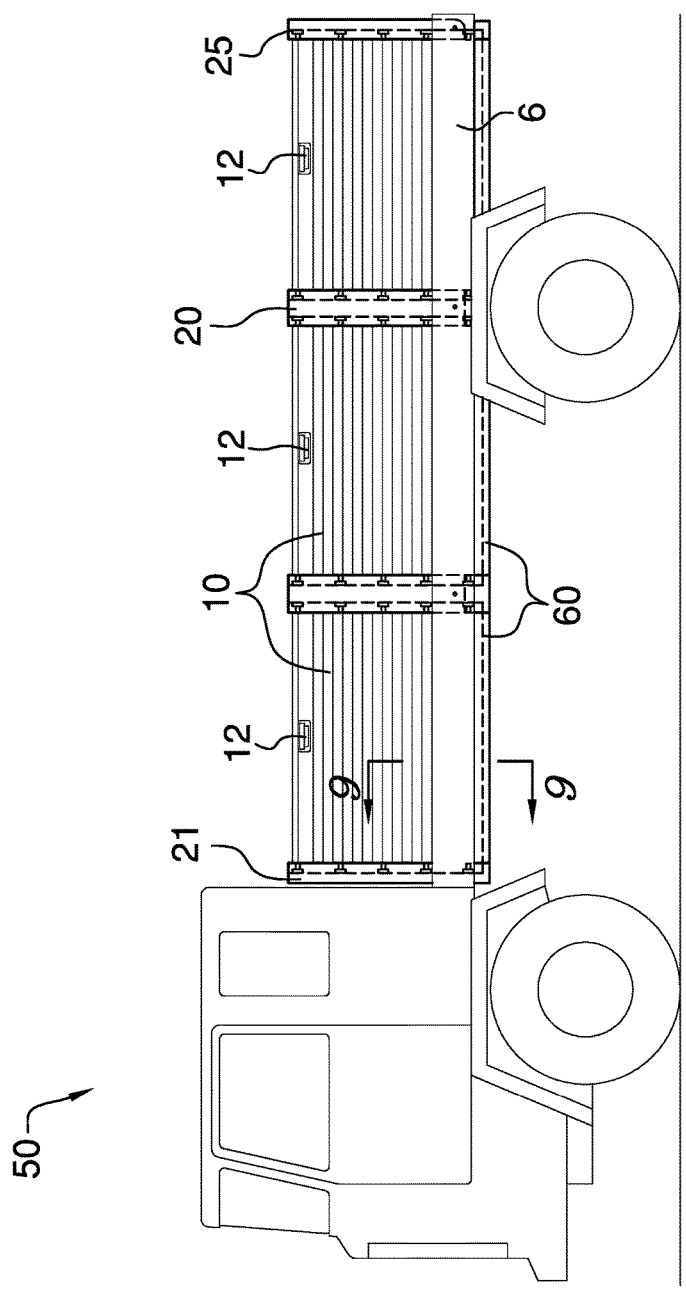
FIG. 7 is a side view of the second embodiment showing the cargo walls in a raised position.

The pivoting posts 20 are also capable of being raised and lowered. When the pivoting posts are in a lowered position, they are laid in a horizontal position in a cavity 30 of the bed 6 of the truck. The cavity 30 is located on the sides of the bed 6. The pivot posts are locked in a lowered position or a raised position with a locking pin 22 Some pivot posts 20 may have a track 25 on opposing sides of the bed and other pivot posts would have only one track 25, which is shown in FIG. 7.

Third Embodiment

Figure 10:
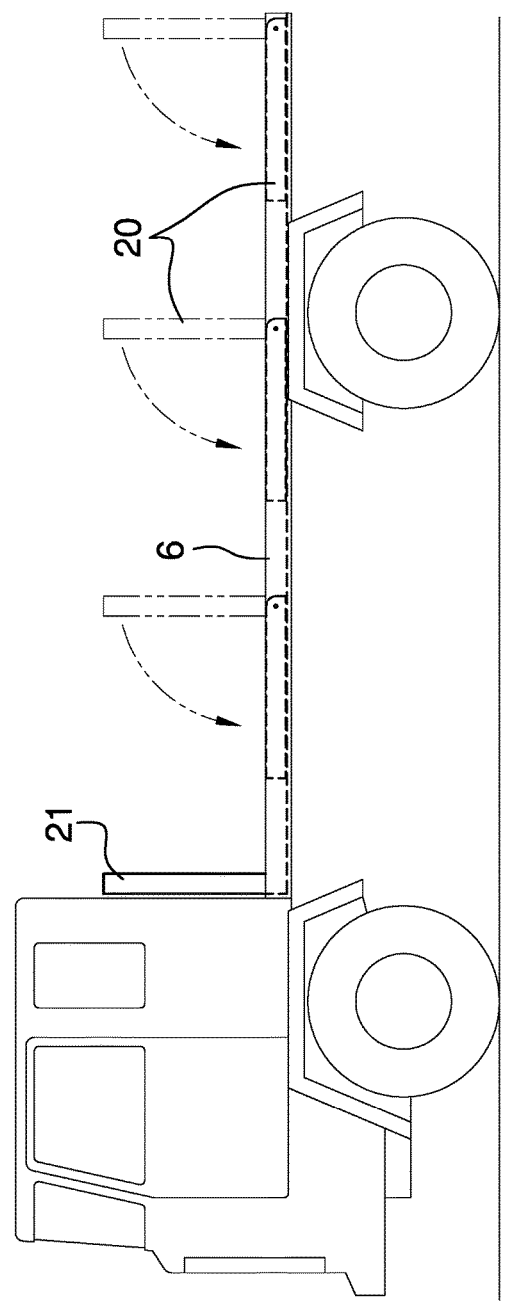
FIG. 10 is a side view of a flatbed truck showing a third embodiment, which provides a plurality of pivoting posts that collapse flush into the bed of the vehicle. A pair of fixed posts are also provided at the front of the flat bed.

The third embodiment of this invention is comprised of a bed 6, pivot posts 20, fixed posts 21, and locking pins 22. The pivoting posts 20 are capable of being raised and lowered, which is shown in FIG. 10. When the pivoting posts 20 are in a lowered position, they are laid in a horizontal position within a cavity 30 of the bed 6 of the truck. The cavity 30 is located on the sides of the bed 6. The pivoting posts 20 are locked in a lowered position or a raised position with a locking pin 22.

When the pivoting posts are in a raised position, they each stand perpendicular to the bed 6 of the flatbed truck. When the pivoting posts 20 are in a lowered position, the each lay within a cavity 30 so that posts 20 are flush with the surface of the bed. FIG. 10 shows the transition between a raised pivoting post 20 and a lowered pivoting post 20. FIG. 10 additionally shows the fixed posts 21 near the cab of the truck.

When the pivoting post 20 is in a raised position, the user would remove the locking pin 22 to lower the post 20. Once the post 20 is lowered, the locking pin would be used to lock the post in a lowered position.

Fourth Embodiment

Figure 11:
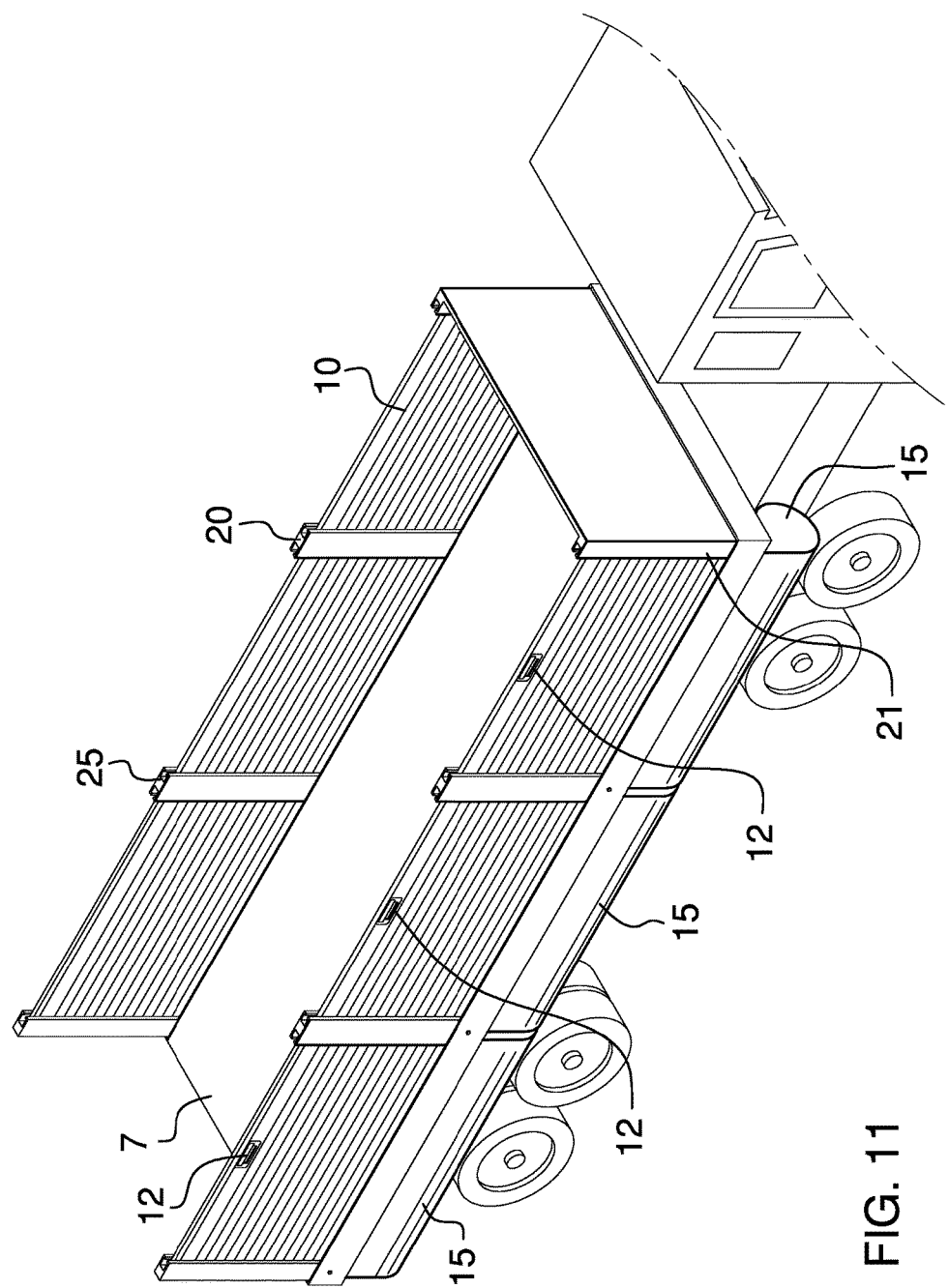
FIG. 11 is an isometric view of a fourth embodiment showing the cargos wall with rollup canisters attached to a trailer.
Figure 12:
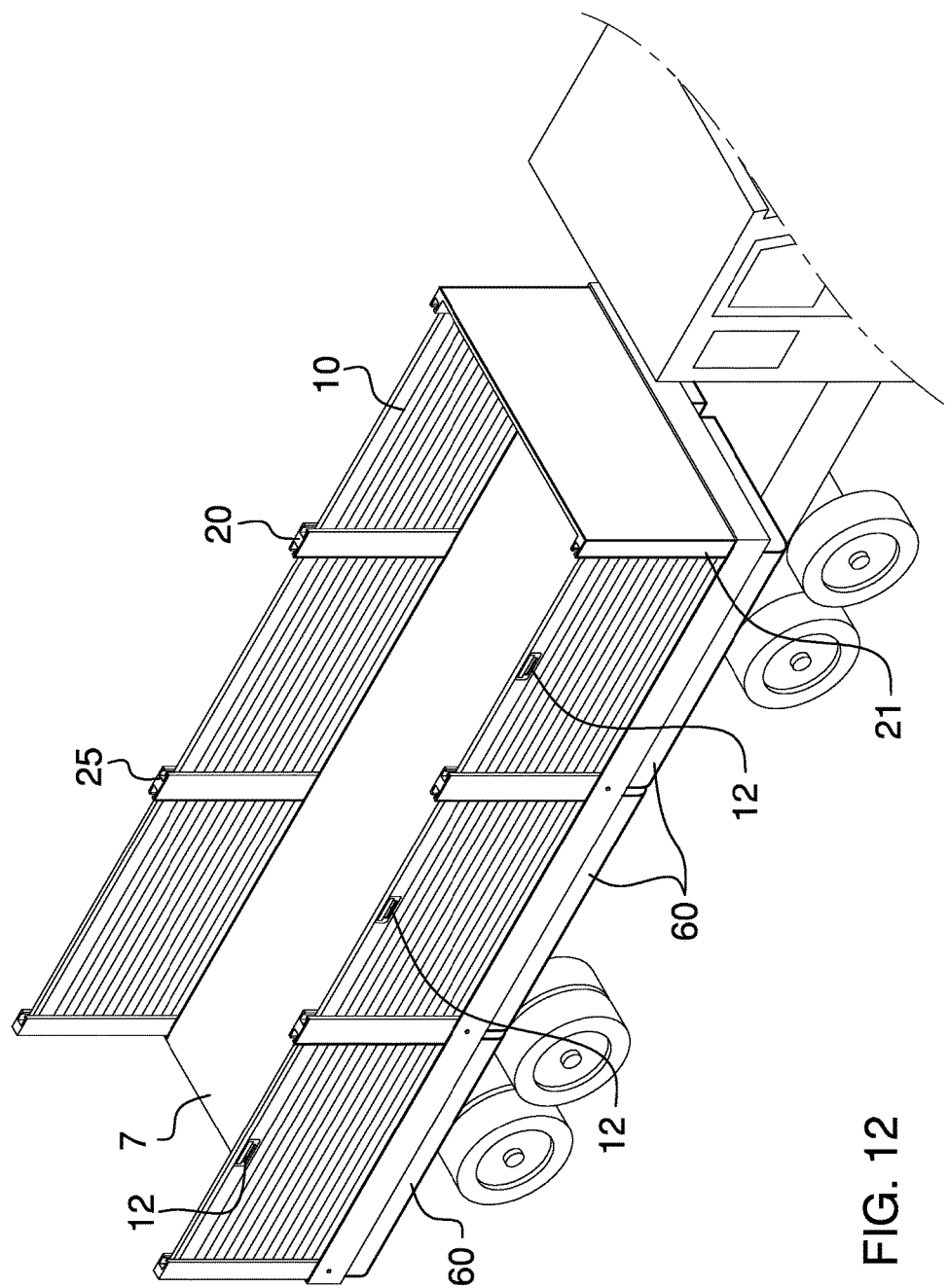
FIG. 12 is an isometric view of the fifth embodiment showing the cargo walls with trays attached to a trailer.

The fourth embodiment of this invention is comprised of cargo walls 10, a plurality of wheels 11, roll-up canisters 15, pivot posts 20, fixed posts 21, locking pins 22, and post tracks 25. The roll-up canisters 15 are attached to the side of the bed 7 of the flatbed trailer, which is shown in FIG. 11. The walls 10 can be raised and lowered as the user desires by sliding the walls 10 along the tracks 25 in the pivot posts 20 as well as the tracks in the fixed posts 21. A plurality of wheels 11 are provided on the walls 10 and enable the walls 10 to slide within the tracks 25.

A handle 12 is provided for the user to grasp when raising and lowering the wall 10. It is anticipated for the walls 10 to be raised and lowered at variable heights as the user desires. The handle 12 located on the exterior of the wall 10 is similar to the handle commonly used on the tailgate of a truck. The handle 12 is pulled or released it actuates a rod 13 within the cargo wall 10, which extend into one of a plurality of holes 26 placed within the track 25 of a pivoting post 20 or fixed post 21. When the handle 12 is released, rod 13 extends into one of the plurality of holes 26, thereby locking the cargo wall 10 into position along the track 25 of the respective adjacent posts. It is anticipated that the cargo walls 10 will be spring loaded to counter the weight of the wall as it is raised and lowered. The spring can be housed in the rollup canister 15. Alternatively, an electric motor can be utilized to raise and lower the cargo walls 10 as well. Furthermore, the leading edge of the cargo wall 10 acts as a top rail.

The pivoting posts 20 are also capable of being raised and lowered. When the pivoting posts are in a lowered position, they are laid in a horizontal position in a cavity 30 of the bed 5 of the truck. The cavity 30 is located on the sides of the bed 5. The pivot posts are locked in a lowered position or a raised position with a locking pin 22 Some pivot posts 20 may have a track 25 on opposing sides of the bed and other pivot posts would have only one track 25, which is shown in FIG. 1.

It is anticipated for the walls to be raised and lowered at variable heights as the user desires, which is shown in FIG. 2. This can be accomplished in a variety of ways by placing an electric motor in the canister 15 or a locking pin which is actuated by pulling the handle of its respective wall 10.

Fifth Embodiment

The fifth embodiment of this invention is comprised of a bed cargo walls 10, a plurality of wheels 11, trays 60, pivot posts 20, fixed posts 21, locking pins 22, and post tracks 25, and tray tracks 70. The trays 60 are attached to the bottom of the bed 5 of the flatbed truck, which is shown in FIG. 8. The walls 10 can be raised and lowered as the user desires by sliding the walls 10 along the tracks 25 and tracks 70. A plurality of wheels 11 are provided on the walls 10 and enable the walls 10 to slide within the tracks 25 and tracks 70.

A handle 12 is provided for the user to grasp when raising and lowering the wall 10. It is anticipated for the walls 10 to be raised and lowered at variable heights as the user desires. The handle 12 located on the exterior of the wall 10 is similar to the handle commonly used on the tailgate of a truck. The handle 12 is pulled or released it actuates a rod 13 within the cargo wall 10, which extend into one of a plurality of holes 26 placed within the track 25 of a pivoting post 20 or fixed post 21. When the handle 12 is released, rod 13 extends into one of the plurality of holes 26, thereby locking the cargo wall 10 into position along the track 25 of the respective adjacent posts. It is anticipated that the cargo walls 10 will be spring loaded to counter the weight of the wall as it is raised and lowered. Alternatively, an electric motor can be utilized to raise and lower the cargo walls 10 as well. Furthermore, the leading edge of the cargo wall 10 acts as a top rail.

The pivoting posts 20 are also capable of being raised and lowered. When the pivoting posts are in a lowered position, they are laid in a horizontal position in a cavity 30 of the bed 7 of the truck. The cavity 30 is located on the sides of the bed 7. The pivot posts are locked in a lowered position or a raised position with a locking pin 22. Some pivot posts 20 may have a track 25 on opposing sides and other pivot posts would have only one track 25, which is shown in FIG. 7.

It is anticipated for the walls to be raised and lowered at variable heights as the user desires. This can be accomplished in a variety of ways by placing an electric motor in the canister 15 or a locking pin which is actuated by pulling the handle of its respective wall 10.

Sixth Embodiment

Figure 13:
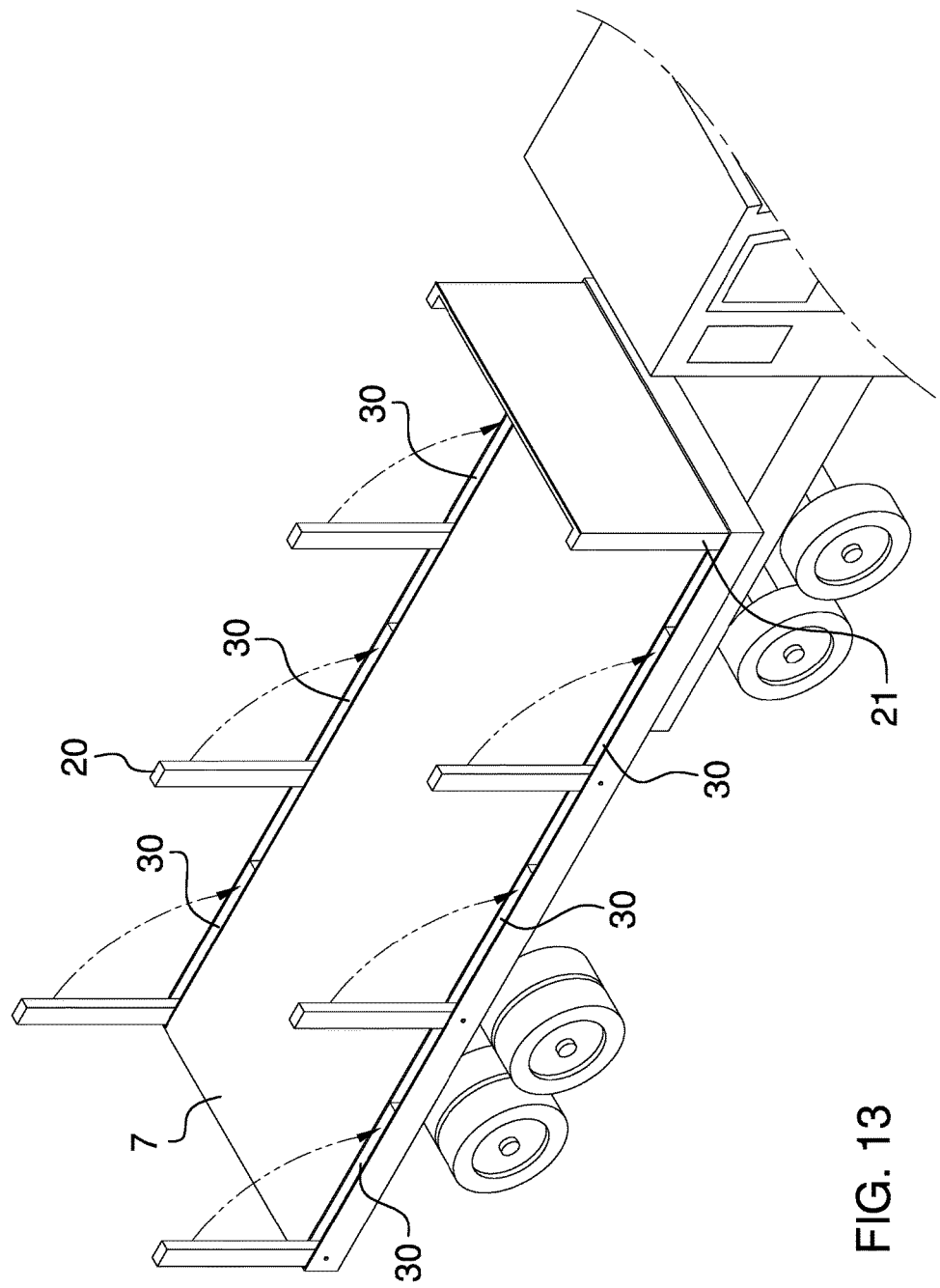
FIG. 13 is an isometric view of the sixth embodiment showing a plurality of pivoting posts that collapse flush into the bed of the trailer. A pair of fixed posts are also provided at the front of the trailer.
Figure 14:
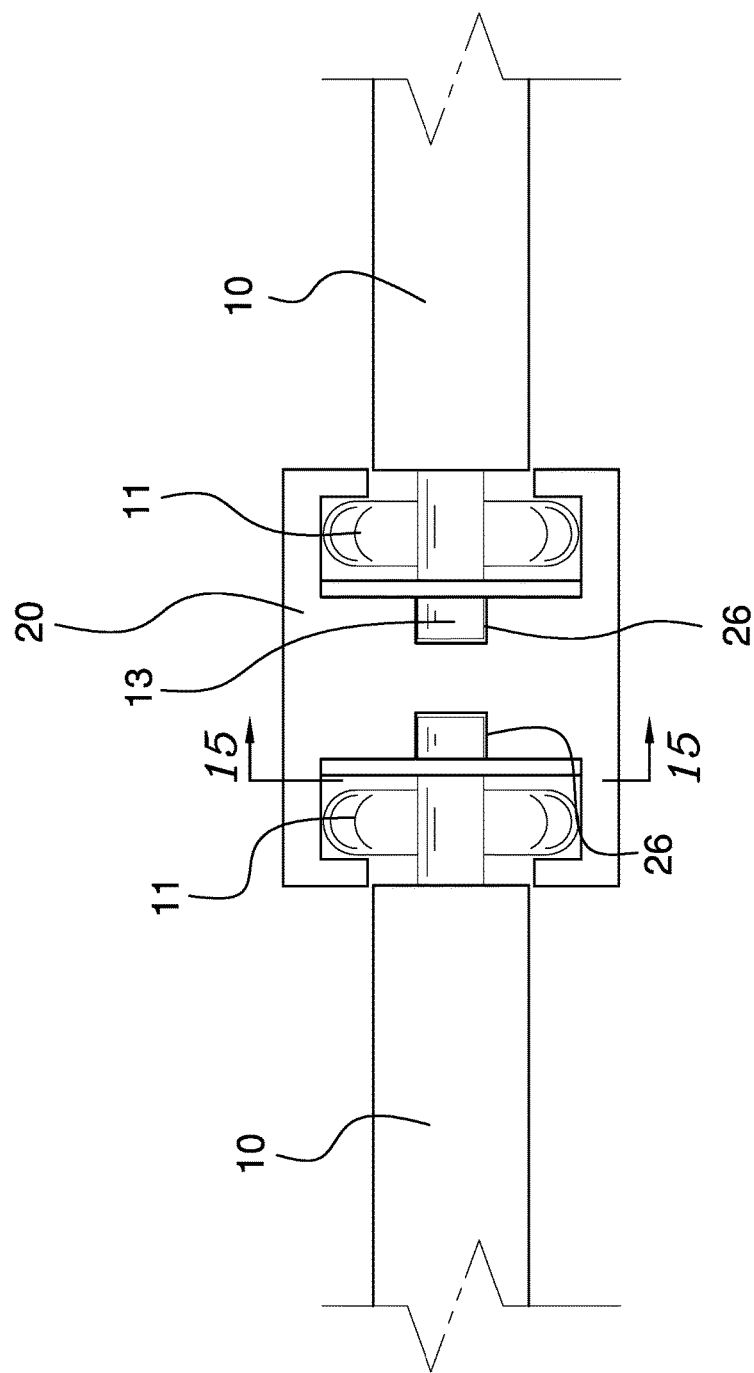
FIG. 14 is a top view of the pivoting post and cargo walls, showing the cargo wall rod entering a hole in the post, thereby locking the cargo wall in position.
Figure 15:
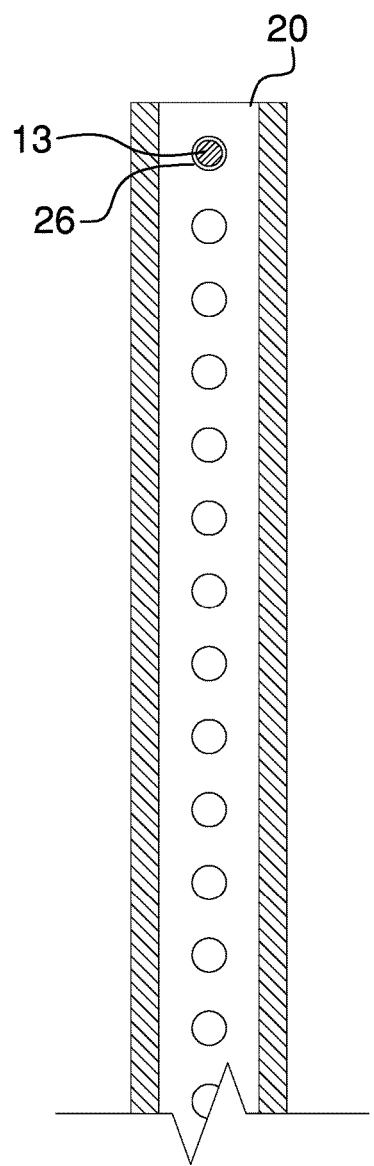
FIG. 15 is a cross-sectional view of FIG. 14, showing the cargo wall rod inside a hole within the pivoting post.
Figure 16:
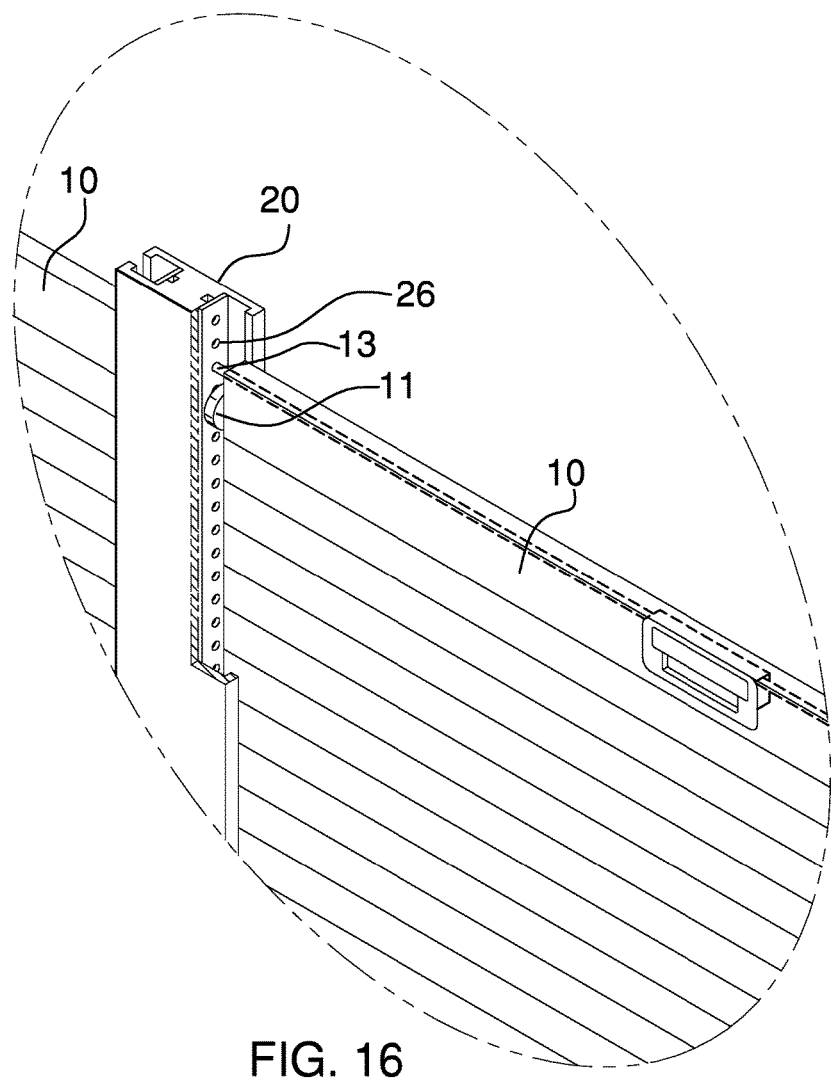
FIG. 16 shows an isometric view of the wheels that fit within the track and the rod extending from the cargo wall into a hole within the pivoting post. Part of the pivoting post is removed to show how the cargo walls may adjust in height with the use of the cargo wall handle, the cargo wall rod, and the holes in the pivoting post.

The sixth embodiment of this invention is comprised of a bed 7, pivot posts 20, fixed posts 21, and locking pins 22. The pivoting posts 20 are capable of being raised and lowered, which is shown in FIG. 13. When the pivoting posts 20 are in a lowered position, they are laid in a horizontal position within a cavity 30 of the bed 7 of the truck. The cavity 30 is located on the sides of the bed 7. The pivoting posts 20 are locked in a lowered position or a raised position with a locking pin 22. When the pivoting posts are in a raised position, they each stand perpendicular to the bed 7 of the flatbed truck. When the pivoting posts 20 are in a lowered position, the each lay within a cavity 30 so that posts 20 are flush with the surface of the bed. FIG. 10 shows the transition between a raised pivoting post 20 and a lowered pivoting post 20. FIG. 10 additionally shows the fixed posts 21 near the cab of the truck.

When the pivoting post 20 is in a raised position, the user would remove the locking pin 22 to lower the post 20. Once the post 20 is lowered, the locking pin would be used to lock the post in a lowered position.

While the embodiments of the invention have been disclosed, certain modifications may be made by those skilled in the art to modify the invention without departing from the spirit of the invention.

The invention claimed is:
1. A device which is comprised of:
 a. a flatbed;
 b. a plurality of posts;
  wherein the plurality of posts is attached to the flatbed;
  wherein at least one post of the plurality of posts is fixed;

wherein at least one post of the plurality of posts pivots;
c. a plurality of cavities;
   wherein the plurality of cavities is provided in the flatbed;
   wherein the plurality of posts fit within the plurality of cavities.

2. The device as described in claim 1 wherein the flatbed is provided on a trailer.

3. The device as described in claim 1 wherein the flatbed is provided on a truck.

* * * * *